US008607892B2

(12) United States Patent
Iimura et al.

(10) Patent No.: US 8,607,892 B2
(45) Date of Patent: Dec. 17, 2013

(54) ROTARY STRIKING TOOL

(75) Inventors: Yoshio Iimura, Ibaraki (JP); Kenro Ishimaru, Ibaraki (JP); Kazutaka Iwata, Ibaraki (JP); Nobuhiro Takano, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 359 days.

(21) Appl. No.: 12/877,251

(22) Filed: Sep. 8, 2010

(65) Prior Publication Data

US 2011/0073334 A1 Mar. 31, 2011

(30) Foreign Application Priority Data

Sep. 30, 2009 (JP) ................................ P2009-229142
Sep. 30, 2009 (JP) ................................ P2009-229143

(51) Int. Cl.
*B23Q 5/10* (2006.01)

(52) U.S. Cl.
USPC ................ 173/181; 173/2; 173/200; 173/217

(58) Field of Classification Search
USPC .............. 173/2, 176, 181, 183, 200, 201, 217
See application file for complete search history.

(56) References Cited

U.S. PATENT DOCUMENTS

| | | | | |
|---|---|---|---|---|
| 5,366,026 | A * | 11/1994 | Maruyama et al. | 173/180 |
| 5,421,240 | A * | 6/1995 | Ohta et al. | 91/59 |
| 6,378,623 | B2 * | 4/2002 | Kawarai | 173/180 |
| 6,607,041 | B2 * | 8/2003 | Suzuki et al. | 173/4 |
| 6,680,595 | B2 * | 1/2004 | Ito | 318/434 |
| 6,968,908 | B2 * | 11/2005 | Tokunaga et al. | 173/181 |
| 7,036,605 | B2 * | 5/2006 | Suzuki et al. | 173/20 |
| 7,216,723 | B2 * | 5/2007 | Ohtsu et al. | 173/2 |
| 7,334,648 | B2 * | 2/2008 | Arimura | 173/179 |
| 7,419,013 | B2 * | 9/2008 | Sainomoto et al. | 173/181 |
| 7,770,658 | B2 * | 8/2010 | Ito et al. | 173/1 |
| 2002/0134172 | A1 * | 9/2002 | Yamada et al. | 73/862.21 |
| 2004/0144552 | A1 * | 7/2004 | Suzuki et al. | 173/2 |

(Continued)

FOREIGN PATENT DOCUMENTS

| | | |
|---|---|---|
| CN | 1695898 A | 11/2005 |
| CN | 1796054 A | 7/2006 |

(Continued)

OTHER PUBLICATIONS

European Search Report issued in European Patent Application No. EP 10009289.9 dated Dec. 13, 2010.

(Continued)

*Primary Examiner* — Andrew M Tecco
(74) *Attorney, Agent, or Firm* — McDermott Will & Emery LLP

(57) ABSTRACT

According to an aspect of the present invention, there is provided a rotary striking tool includes: a motor; an oil pulse unit that is driven by the motor; an output shaft that is coupled to the oil pulse unit so that a tip tool can be attached to the output shaft; a first detection unit that detects a rotation angle of the motor and outputs a first output signal; a second detection unit that detects an impact generated at the oil pulse unit and outputs a second output signal; and a control unit that controls a rotation of the motor, wherein the control unit uses a portion of the second output signal based on the first output signal for control of the rotation of the motor.

7 Claims, 13 Drawing Sheets

(56) References Cited

U.S. PATENT DOCUMENTS

| | | | | |
|---|---|---|---|---|
| 2005/0263304 | A1 | 12/2005 | Sainomoto et al. | |
| 2006/0137887 | A1 | 6/2006 | Ohtsu et al. | |
| 2006/0185869 | A1 | 8/2006 | Arimura | |
| 2006/0278416 | A1 | 12/2006 | Tanji | |
| 2009/0014192 | A1* | 1/2009 | Ito et al. | 173/1 |
| 2011/0203822 | A1* | 8/2011 | Harada et al. | 173/20 |

FOREIGN PATENT DOCUMENTS

| | | | |
|---|---|---|---|
| CN | 1873234 | A | 12/2006 |
| EP | 0 638 394 | A1 | 2/1995 |
| EP | 2 239 099 | A2 | 10/2010 |
| JP | 06-091552 | | 4/1994 |
| JP | 2000-210877 | A | 8/2000 |
| JP | 2001-246573 | A | 9/2001 |
| JP | 2005-305578 | | 11/2005 |
| JP | 2006-015438 | A | 1/2006 |
| JP | 2006-231446 | A | 9/2006 |
| WO | WO 2009/136666 | A1 | 11/2009 |

OTHER PUBLICATIONS

Chinese Office Action, w/ English translation thereof, issued in Chinese Patent Application No. CN 201010503533.3 dated May 14, 2013.

Japanese Notification of Reasons for Refusal, w/ English translation thereof, issued in Japanese Patent Application No. JP 2009-229142 dated Aug. 19, 2013.

* cited by examiner (FIG. 7 CONTINUED)
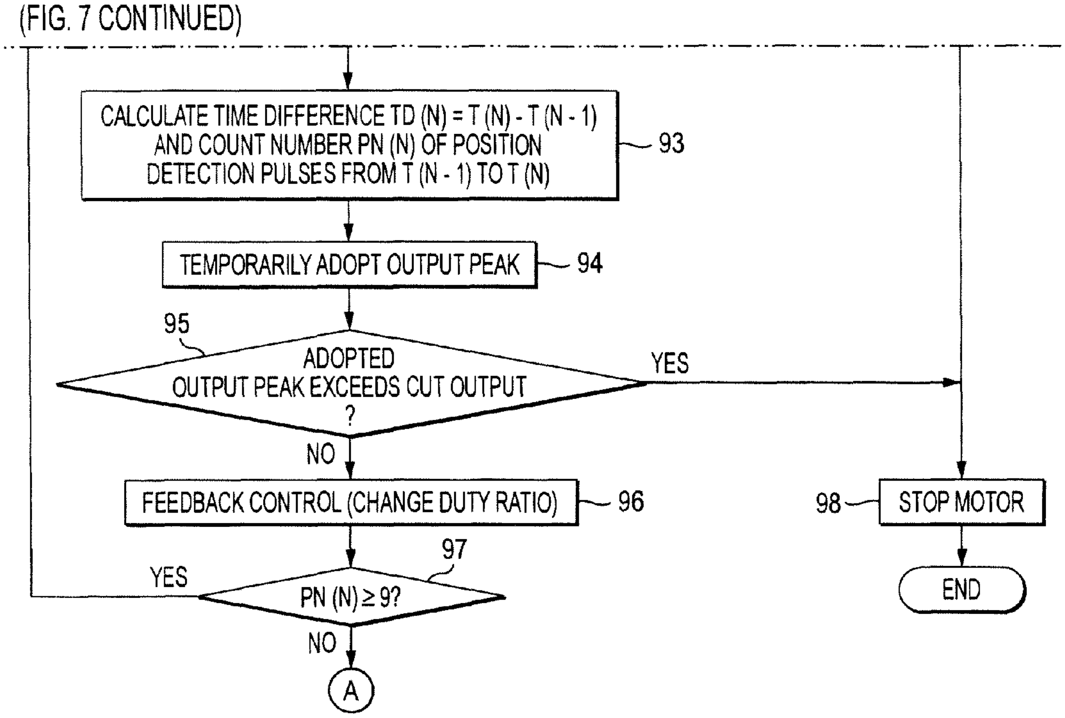

ROTARY STRIKING TOOL

CROSS-REFERENCE TO RELATED APPLICATION(S)

This application is based upon and claims priorities from Japanese Patent Application No. 2009-229142 filed on Sep. 30, 2009 and Japanese Patent Application No. 2009-229143 filed on Sep. 30, 2009, the entire contents of which are incorporated herein by reference.

BACKGROUND

1. Field of the Invention

An aspect of the present invention relates to a rotary striking tool which is driven and rotated by a motor to thereby fasten a fastening subject such as a screw or a bolt by using an intermittent striking force.

2. Description of the Related Art

A rotary striking tool (driving tool) for fastening a screw or a bolt etc. by applying a rotation force or a rotational-direction striking force is known. JP-2005-305578-A discloses an impact driver as the kinds of the rotary striking tool. In the impact driver disclosed in JP-2005-305578-A, a hummer part rotates while being axially-movable by using a spring or a cam mechanism, and a hammer strikes an anvil once or twice with respect to a single rotation of the anvil. JP-H06-091552-A discloses an oil pulse tool using an oil pulse unit as the striking mechanism.

The oil pulse tool has a feature that the level of the operation sound is low since metal parts never contact to each other. In the oil pulse tool, a motor is used as a power source for driving an oil pulse unit, and the rotation shaft of the motor is directly coupled to the oil pulse unit. When a trigger switch for operating the oil pulse tool is pulled, a driving electric power is supplied to the motor. The rotation speed of the motor is controlled by changing the driving force of the motor in response to the pulling amount of the trigger switch. When the oil pulse unit generates a pulse torque, a strong striking torque is transmitted to a tip tool, whereby a torque sensor detects the peak torque of the output shaft at every striking operation. An angular sensor is provided at the output shaft to detect the rotation angle of the output shaft, whereby the peak torque value is controlled to approach a target torque value in accordance with a difference between the previously-set target curve of the peak torque values from the fastening start timing to the fastening completion timing and the measured peak torque value.

In the oil pulse unit of JP-H06-091552-A, high-pressure air is used as the power source. On the other hand, in recent years, a rotary striking tool using an electric motor is used. According to the rotary striking tool using the electric motor, the peak torque value is detected at every striking operation. For example, a target torque value for the next striking operation is set in accordance with the detected peak torque value at the previous striking operation, and the motor is controlled to perform the striking operation with the target torque value. The motor is stopped when the peak torque value at the striking operation exceeds a reference value for determining the completion of the fastening operation. In the control of the fastening operation, it is important to accurately detect the peak torque value at the striking operation by using the torque sensor. It is important to accurately discriminate the main striking pulse for controlling control the motor, due to the configuration of the oil pulse unit, not only the peak torque (hereinafter referred to as "main striking pulse"); due to the main striking operation but also a peak torque (hereinafter referred to as "half pulse"); and due to a pseudo striking operation that appears at the angular position different by about 180 degrees from the main striking position.

SUMMARY

One object of the invention is to provide a rotary striking tool using an oil pulse unit which can accurately discriminate an impact due to a main striking and an impact due to other causes to thereby control the rotation of a motor.

Another object of the invention is to provide the rotary striking tool using an oil pulse unit which can accurately discriminate the impact due to the main striking and the impact due to other causes by utilizing the output of the position detection element of a brushless motor.

A still another object of the invention is to provide the rotary striking tool using an oil pulse unit in which a threshold value for ignoring the output from an impact detector is set and the outputs smaller than the threshold value are excluded from being used for the rotation control of the motor to thereby enable the fastening control without being influenced by noise.

According to one feature of the invention, a rotary striking tool includes a motor; an oil pulse unit which is driven by the motor; an output shaft which is coupled to the oil pulse unit and to which a tip tool is attached; and an impact detection unit which detects an impact generated at the oil pulse unit, wherein a rotation angle of the oil pulse unit between an output from the impact detection unit detected at a previous main striking and an output from the impact detection unit detected at a current time is detected, wherein the output value from the impact detection unit detected at the current time is adopted when the detected rotation angle is about 360 degrees, whilst the output value from the impact detection unit detected at the current time is not adopted when the detected rotation angle is about 180 degrees, and wherein a fastening control is performed by using the adopted output value. When the adopted output value reaches a predetermined output value, it is determined that fastening operation is completed, and the rotation of the motor is stopped.

According to another feature of the invention, the motor is a brushless motor having a rotation position detection element, and the rotation angle of the oil pulse unit is indirectly detected by using the rotation position detection element. A threshold value is provided with respect to output values from the impact detection unit, and an output value from the impact detection unit equal to or smaller than the threshold value is not adopted. First to third output values each exceeding the threshold value after a control reference time (after the control of the motor is started) are detected, then the third output value is determined as an output value due to a main striking when a time interval between the first output value and the second output value is longer than a time interval between the second output value and the third output value, then the third output value is determined as an output pulse due to a half pulse when the time interval between the first output value and the second output value is shorter than the time interval between the second output value and the third output value, and the fastening control is performed by using the output value due to the main striking. Thus, the influence of the half pulse on the fastening control can be eliminated, and the rotation control of the motor is performed by using only the output value due to the main striking.

According to still another feature of the invention, the rotary striking tool is further provided with a control unit which processes a signal detected by the impact detection unit and controls the rotation of the motor by using the detected signal. The control unit has a microprocessor and compares the adopted output value with a target output value to perform a feedback control to thereby control the rotation of the motor with a high accuracy.

According to a first aspect of the invention, the rotation angle of the oil pulse unit between the output from the impact detection unit detected at the previous main striking and the output from the impact detection unit detected at the current time, wherein the output value from the impact detection unit detected at the current time is adopted when the detected rotation angle is about 360 degrees, whilst the output value from the impact detection unit detected at the current time is not adopted when the detected rotation angle is about 180 degrees, and wherein the fastening control is performed by using the adopted output value. Thus, the fastening operation of the rotary striking tool can be performed accurately without being influenced by the half pulse detected by the impact detection unit such as an impact sensor.

According to a second aspect of the invention, since the rotation of the motor is stopped when the adopted output value reaches the predetermined output value, the fastening procedure can be terminated after confirming that the fastening operation is surely completed by the main striking.

According to a third aspect of the invention, the motor is the brushless motor having the rotation position detection element, and the rotation angle of the oil pulse unit is detected by using the rotation position detection element. Thus, since it is not necessary to provide a sensor for detecting the rotation angle at the output shaft to which the tip tool is attached, the size and the manufacturing cost of the rotary striking tool can be reduced According to a fourth aspect of the invention, since the threshold value is provided with respect to the output values from the impact detection unit and the output value from the impact detection unit equal to or smaller than the threshold value is not adopted, the fastening control can be prevented from being badly influenced by the small output value even if a scraping operation etc. occurs after the main striking.

According to a fifth aspect of the invention, after the start of the motor control (after the control reference time), the first to third output values each exceeding the threshold value are detected, and the time interval between the first output value and the second output value is compared with the time interval between the second output value and the third output value to thereby determine whether the third output value is an output value due to a main striking or an output pulse due to a half pulse. Accordingly, the operation of the embodiment can be easily realized by merely changing the control of the control unit without changing the configuration of the existing detection circuit.

According to a sixth aspect of the invention, the rotary striking tool is further provided with the control unit which processes the signal detected by the impact detection unit and controls the rotation of the motor by using the detected signal, so that the rotation of the motor can be controlled with a high accuracy.

According to a seventh aspect of the invention, the control unit has the microprocessor and compares the adopted output value with the target output value to thereby perform the feedback control, so that the rotation of the motor can be controlled with a high accuracy based on the target output value.

According to still another feature of the invention, a rotary striking tool includes a motor including rotation position detection elements; an oil pulse unit which is driven by the motor; an output shaft which is coupled to the oil pulse unit and to which a tip tool is attached; and an impact detection unit which detects an impact generated at the oil pulse unit, wherein when the impact detection unit outputs an output value representing the detected impact, a time interval from the detection thereof to a position signal from the rotation position detection element appearing thereafter is measured, wherein when the measured time interval is equal to or longer than a predetermined time, the output value is determined to be an output value due to a main striking, wherein when the measured time interval is shorter than the predetermined time, the output value is determined to be an output value due to a half pulse, and wherein a fastening control is performed by using the output value due to the main striking. The rotation of the motor is stopped when an impact due to the main impact reaches a predetermined output value.

According to still another feature of the invention, the motor further includes a rotor having a permanent magnet and a stator having a winding, wherein each of the rotation position detection elements is configured by a hall element disposed to face the permanent magnet, and wherein the position signal is formed by output signals from the rotation position detection elements. The hall element detects magnetic field by using the hall effect and acts to convert the magnetic field generated by a magnet or current into an electric signal to thereby output the electric signal. The three hall elements are disposed with a predetermined interval therebetween along the circumferential direction. The position signal is generated at every predetermined-angle rotation of the rotor, for example, at every 30-degrees rotation.

According to still another feature of the invention, a threshold value is provided with respect to output values from the impact detection unit, and an output value from the impact detection unit equal to or smaller than the threshold value is not adopted for the measurement of the time interval. The rotary striking tool is further provided with a control unit which processes a detection signal from the impact detection unit and controls the rotation of the motor by using the detection signal. The control unit has a microprocessor and compares the output value from the impact detection unit with a target output value to perform a feedback control, preferably.

According to an eighth aspect of the invention, when the impact detection unit detects the output value, the measurement is made as to a time interval from the detection thereof to the position signal from the rotation position detection element appearing thereafter. The output value is determined to be due to the main striking when the measured time interval is the predetermined time or more, whereby the rotary striking tool can be realized which can perform the fastening operation accurately without being influenced by the half pulse detected by the impact detection unit.

According to a ninth aspect of the invention, the motor includes the rotor having the permanent magnet and the stator having the winding, and each of the rotation position detection elements is configured by a hall element provided so as to opposite to the permanent magnet, and the position signal is formed by the output signals from the hall elements. Thus, since it is not necessary to provide a sensor for detecting the rotation angle at the output shaft to which the tip tool is attached, the size and the manufacturing cost of the rotary striking tool can be reduced According to a tenth aspect of the invention, the three hall elements are disposed with a predetermined interval and the position signal is generated at every predetermined-angle rotation of the rotor. Thus, the rotation angle of the oil pulse unit can be detected by using the rotation position detection elements of the motor.

According to an eleventh aspect of the invention, since the rotation of the motor is stopped when the output value reaches the predetermined output value, the fastening procedure can be terminated after confirming that the fastening operation is surely completed by the main striking.

According to a twelfth aspect of the invention, the threshold value is provided with respect to output values from the impact detection unit, and the output value from the impact detection unit equal to or smaller than the threshold value is not adopted for the measurement of the time interval. Thus, the fastening control can be prevented from being badly influenced by the small output value even if a scraping operation etc. occurs after the main striking.

According to a thirteenth aspect of the invention, the rotary striking tool is further provided with the control unit which processes the signal detected by the impact detection unit and controls the rotation of the motor by using the detected signal, so that the rotation of the motor can be controlled with a high accuracy.

According to a fourteenth aspect of the invention, the control unit has the microprocessor and compares the adopted output value with the target output value to thereby perform the feedback control, so that the rotation of the motor can be controlled with a high accuracy based on the target output value.

According to still another feature of the invention, a rotary striking tool includes: a motor; an oil pulse unit that is driven by the motor; an output shaft that is coupled to the oil pulse unit; a first detection unit that detects a rotation angle of the motor; and a second detection unit that detects an impact generated at the oil pulse unit, wherein an output of the second detection unit is selectively adopted, in accordance with an output of the first detection unit.

According to still another feature of the invention, a rotary striking tool includes: a motor; an oil pulse unit that is driven by the motor; an output shaft that is coupled to the oil pulse unit; and an impact detection unit that detects an impact generated at the oil pulse unit, wherein an output of the impact detection unit is adopted at every about-360-degrees rotation.

According to still another feature of the invention, a rotary striking tool, includes: a motor; a rotation position detection element that outputs a position signal at a predetermined rotational position of the motor an oil pulse unit that is driven by the motor; an output shaft that is coupled to the oil pulse unit; and an impact detection unit that detects an impact generated at the oil pulse unit, wherein an output of the impact detection unit is adopted in a case where a time interval between two succeeding position signals from the rotation position detection element is equal to or larger than a predetermined interval.

A fastening control may be performed based on the adopted output value.

The aforesaid and other objects and new features of the invention will be apparent from the following description of the specification and accompanying drawings.

DETAILED DESCRIPTION

Hereinafter, the embodiments will be explained with reference to drawings.

[First Embodiment]

Figure 1:
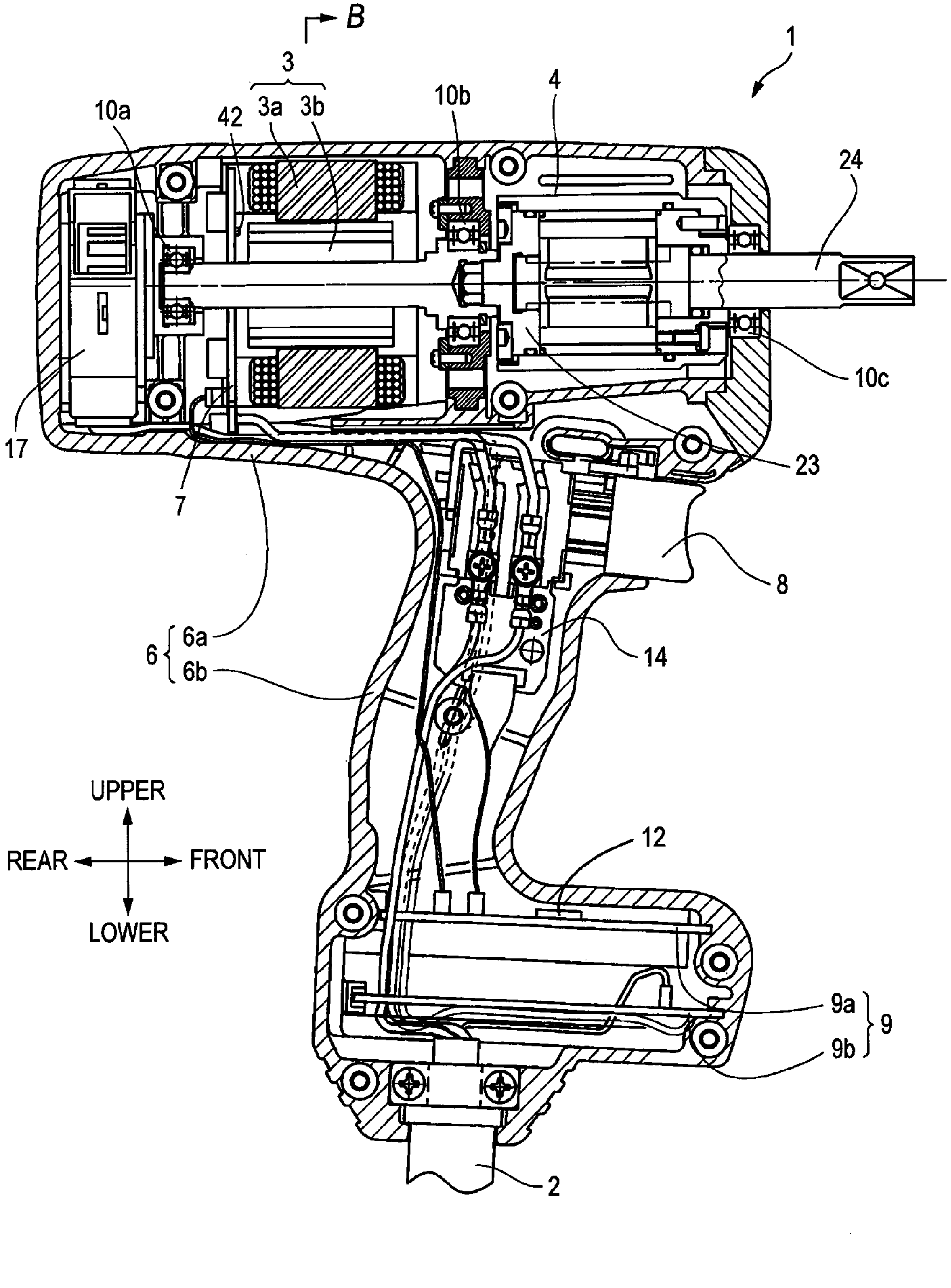
FIG. 1 is a sectional diagram of an impact driver according to a first embodiment.

In a first embodiment, an impact driver using an oil pulse unit is exemplified as a rotary striking tool. FIG. 1 shows the impact driver according to the first embodiment. In the specification, directions of upper, lower, forward and rear will be explained as being coincident with the directions of upper, lower, forward and rear shown in FIG. 1, respectively.

The impact driver 1 performs a fastening procedure for fastening a screw, a nut, a bolt etc. In the fastening procedure, a motor 3 is driven by electric power supplied via a power supply cable 2 from the outside, and then the motor 3 drives an oil pulse unit 4 to apply a rotation force and an impact force to the main shaft of the oil pulse unit 4 to thereby continuously/intermittently transmit a rotation striking force to a not-shown tip tool such as a driver bit, a hexagonal socket etc.

The electric power supplied to the power supply cable 2 is a DC or an AC of 100 volt, for example. In the case of AC, a not-shown rectifier is provided within the impact driver 1 to convert the AC into the DC and to supply the converted DC to the driving circuit for the motor. The motor 3 is a brushless DC motor which includes a rotor **3*b* having permanent magnets on the inner periphery side thereof and a stator 3*a* having a winding wound around an iron core on the outer periphery side thereof. A housing 6 includes a body part 6*a* and a handle part 6*b* integrally formed with each other. The motor is housed within the cylindrical body part 6*a* so that the rotation shaft thereof is rotatably fixed by two bearings 10*a*, 10*b*. The housing 6 is formed of plastics etc. A driving circuit board 7 for driving the motor 3 is disposed on the rear side of the motor 3. An inverter circuit configured by semiconductor elements such as FETs and rotation position detection elements 42 such as hall elements or hall ICs for detecting the rotation positions of the rotary 3*b* are disposed on this circuit board. A cooling fan unit 17 for cooling is provided on the rearmost side of the body part 6*a***.

In the housing 6, the handle part **6*b* extends beneath from the body part 6*a* about orthogonally with respect to the longitudinal direction of the body part 6*a*. A trigger switch 8 is disposed around a portion where the handle part 6*b* is attached to the body part 6***a*. A switch circuit board 14 provided beneath the trigger switch transmits a signal corresponding to the pulling amount of the trigger switch 8 to a motor control board 9*a*. Two control boards 9, that is, the motor control board 9*a* and a rotation position detection board 9*b*, are provided on the lower side of the handle part 6*b*. The motor control board 9*a* is provided with an impact sensor 12 for detecting a striking impact at the oil pulse unit 4. The striking impact can be detected from the output of the impact sensor 12. Instead of providing the impact sensor 12 as an impact detection unit, the striking impact at the oil pulse unit 4 may be detected based on a current flowing through the motor. In this case, the unit that detects the current flowing through the motor may be functioning as the impact detection unit.

The oil pulse unit 4 is housed within the body part 6*a* of the housing 6. In the oil pulse unit 4, a liner plate 23 on the rear side and the main shaft 24 on the front side are provided. The liner plate 23 is directly coupled to the rotation shaft of the motor 3, and the main shaft 24 acts as the output shaft of the impact driver 1. When the trigger switch 8 is pulled to thereby start the motor 3, the rotation force of the motor 3 is transmitted to the oil pulse unit 4. Oil is filled within the oil pulse unit 4. When no load is applied to the main shaft 24 or an applied load is small, the main shaft 24 rotates almost synchronizedly with the rotation of the motor 3 only against the drag of the oil. When a large load is applied to the main shaft 24, the main shaft 24 stops the rotation, while an outer-peripheral liner 21 fixed to the liner plate 23 continues to rotate. The oil pulse unit 4 generates a spiry strong torque and thereby transmits a large fastening torque to the main shaft 24 at a position where the oil is sealed at every one revolution. Hereinafter, similar striking operations are repeated for several times to thereby fasten a fastening subject with a set torque. The main shaft 24 is rotatably supported by the body part 6*a* of the housing 6 through a bearing 10*c*. Although a ball bearing is exemplified as the bearing 10*c* in the first embodiment, another bearing such as a needle bearing may be used in place thereof.

Figure 2:
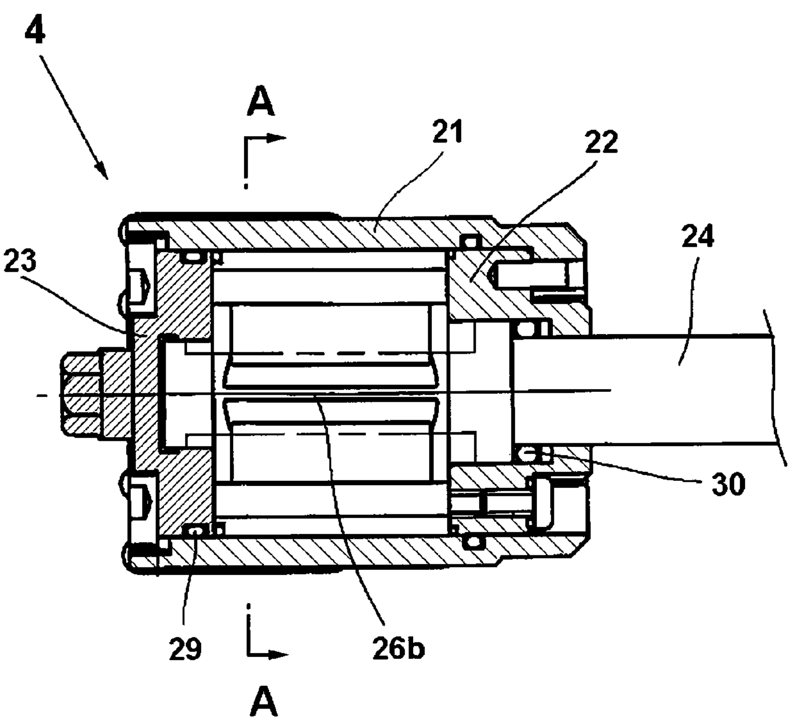
FIG. 2 is an enlarged sectional diagram of an oil pulse unit 4 in the impact driver shown in FIG. 1.

FIG. 2 is an enlarged sectional diagram of the oil pulse unit 4 of the impact driver shown in FIG. 1. The oil pulse unit 4 is mainly configured by two portions, that is, a driving part rotating synchronizedly with the motor 3 and an output part rotating synchronizedly with the main shaft 24 attached with the tip tool. The driving part includes the liner plate 23 directly coupled to the rotation shaft of the motor 3, a liner 21 having a cylinder-like outer periphery fixed to the liner plate 23 and a lower plate 22. One end of the liner 21 is fixed to the outer periphery of the liner plate 23, and the other end forwardly extends. The output part includes the main shaft 24 and blades 25*a*, 25*b*. On the outer circumferential side of the main shaft 24, grooves are formed 24 with the interval of 180 degrees. The blades 25*a*, 25*b* are attached to the grooves on the main shaft 24 via springs, respectively.

The main shaft 24 is inserted into the lower plate 22 and held within a closed space defined by the liner 21, the liner plate 23 and the lower plate 22 so as to be rotatable therein. Oil (operation oil) for generating the torque is filled within the closed space. An O-ring 30 is provided between the lower plate 22 and the main shaft 24, and also an O-ring 29 is provided between the liner 21 and the liner plate 23, thereby securing the sealability. Although not shown, the liner 21 is provided with a relief valve for flowing the oil form the high-pressure side to the low-pressure side, so that the oil pressure (fastening torque) is adjusted.

Figure 3:
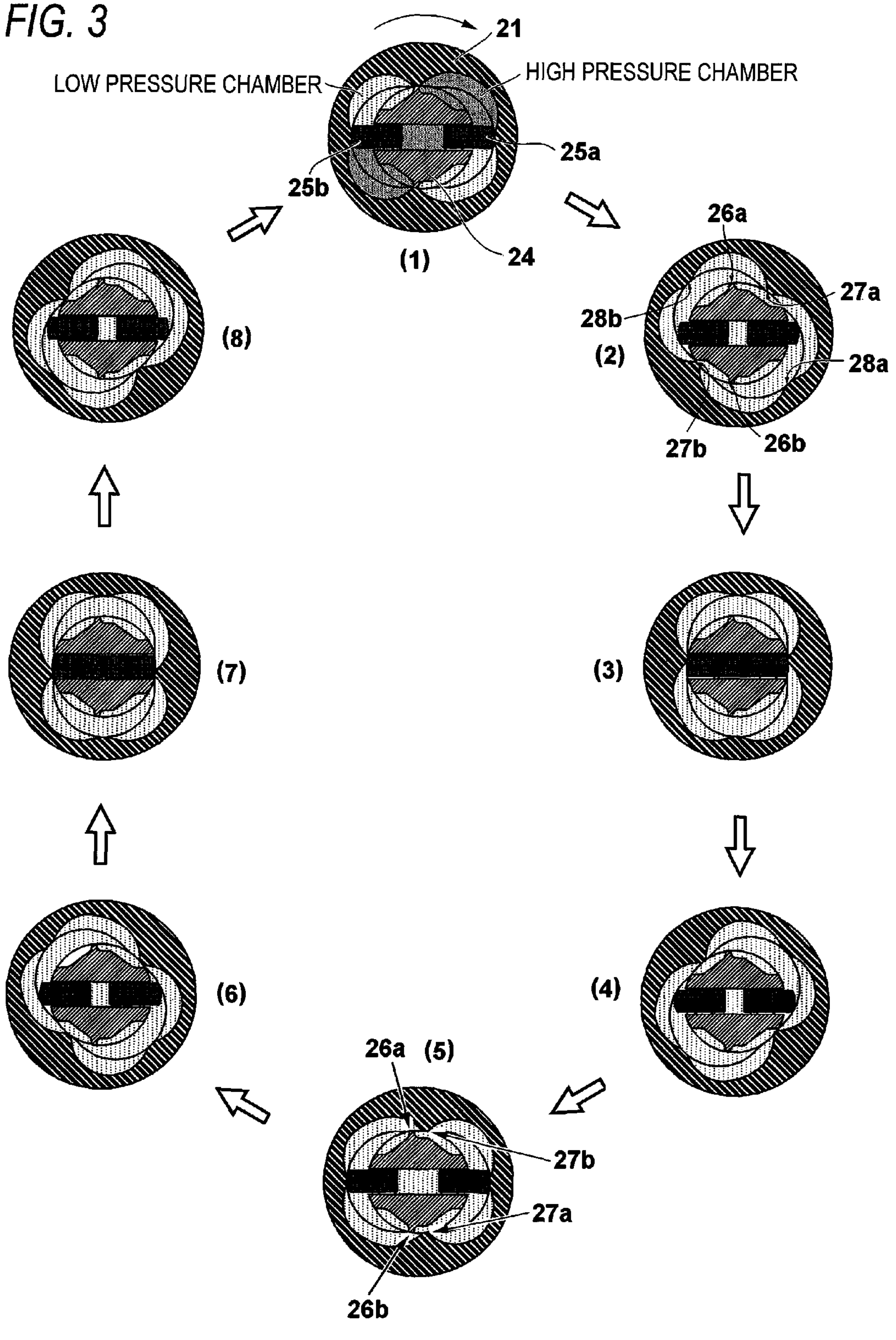
FIG. 3 is a sectional diagram taken along a line A-A in FIG. 2 showing the one revolution motion of the oil pulse unit 4 in eight steps.

FIG. 3 is a sectional diagram taken along a line A-A in FIG. 2 showing the one revolution motion of the oil pulse unit 4 in eight steps. Within the liner 21, a liner chamber having four areas is formed as shown in (1) of FIG. 3. The blades 25*a*, 25*b* are respectively fitted via the springs into the opposed two grooves formed on the outer circumferential side of the main shaft 24, whereby the blades 25*a*, 25*b* are radially urged to abut against the inner surface of the liner 21. Two protruded seal surfaces 26*a*, 26*b* extending to the axis direction are provided on the outer peripheral surface of the main shaft 24 between the blades 25*a*, 25*b*. Protruded seal surfaces 27*a*, 27*b* and protruded parts 28*a*, 28*b* are formed on the inner peripheral surface of the liner 21 so as to have a mountain-like shape, respectively.

In the fastening operation of a bolt by using the impact driver 1, when the seat surface of the fastening-subject bolt is seated, a load is applied to the main shaft 24, whereby the main shaft 24 and the blades 25*a*, 25*b* are almost stopped and only the liner 21 continues to rotate. Since the liner 21 rotates with respect to the main shaft 24, an impact pulse is generated at each revolution of the liner. When the impact pulse is generated within the impact driver 1, the protruded seal surface 27*a* formed on the inner peripheral surface of the liner 21 is made contact with the protruded seal surface 26*a* formed on the outer peripheral surface of the main shaft 24. Simultaneously, the protruded seal surface 27*b* contacts with the protruded seal surface 26*b*. In this manner, since a pair of the protruded seal surfaces 27*a*, 27*b* abut against a pair of the protruded seal surfaces 26*a*, 26*b*, respectively, the inner space of the liner 21 is divided into two high-pressure chambers and two low-pressure chambers. An instantaneous strong rotation force is generated at the main shaft 24 due to a pressure difference between the high-pressure chamber and the low-pressure chamber.

Next, the operation procedure of the oil pulse unit 4 will be explained. (1) to (8) of FIG. 3 show states where the liner 21 rotates by one revolution relatively with respect to the main shaft 24. When the trigger 8 is pulled, the motor 3 rotates and so the liner 21 rotates synchronizedly with the motor. In the first embodiment, the liner plate 23 is directly coupled to the rotation shaft of the motor 3 to rotate in the same speed therewith. However, the liner plate 23 may be coupled to the motor 3 via a speed reduction mechanism or a deceleration mechanism. When no load is applied to the main shaft 24 or an applied load is small, the main shaft 24 rotates almost synchronizedly with the rotation of the motor 3 only against the drag of the oil. When a large load is applied to the tip tool, the central main shaft 24 stops the rotation and only the outer-peripheral liner 21 continues to rotate. FIG. 3 shows the states where only the liner 21 rotates.

(1) of FIG. 3 shows the position in which a striking force is generated at the main shaft 24 due to the impact pulse. The position shown in (1) represents a "position for hermetically sealing the oil" appearing once during one revolution. In this case, the protruded seal surfaces 27*a*, 27*b* respectively abut against the protruded seal surfaces 26*a*, 26*b*, and the blades 25*a*, 25*b* respectively abut against the protruded parts 28*a*, 28*b* on the entire axial range of the main shaft 24, whereby the inner space of the liner 21 is partitioned into four chambers, that is, the two high-pressure chambers and the two low-pressure chambers.

The "high-pressure" and the "low-pressure" represent the pressure of the oil within the inner space. When the liner 21 rotates in accordance with the rotation of the motor 3, since the capacity of the high-pressure chamber reduces, the oil therein is compressed to thereby instantaneously generate a high pressure and push the blade 25 to the low-pressure chamber side. As a result, a rotation force instantaneously acts on the main shaft 24 via the blades 25*a*, 25*b* to thereby generate a strong rotation torque. That is, a strong striking force is generated by the high-pressure chambers to rotate the blades 25*a*, 25*b* in the clockwise direction shown in the figure. The position shown in (1) of FIG. 3 is called a "striking position" in this specification (2) of FIG. 3 shows a state where the liner 21 rotates by 45 degrees from the striking position. When the liner 21 passes the striking position shown in (1), since the abutment between the protruded seal surface 27*a*, 27*b* and the protruded seal surfaces 26*a*, 26*b* and the abutment between the blades 25*a*, 25*b* and the protruded parts 28*a*, 28*b* are cancelled, the space within the liner 21 divided into the four chambers is released. Thus, since the oil flows into the respective chambers, the rotation torque is not generated and the liner 21 further rotates due to the rotation of the motor 3.

(3) of FIG. 3 shows a state where the liner 21 rotates by 90 degrees from the striking position. In this state, the blades 25*a*, 25*b* are radially retreated by being abutted against the protruded seal surfaces 27*a*, 27*b* to positions not protruding from the main shaft 24, respectively. Thus, since there is no influence of the oil pressure and the rotation torque is not generated, the liner 21 continues to rotate.

(4) of FIG. 3 shows a state where the liner 21 rotates by 135 degrees from the striking position. In this state, since the respective areas in the liner 21 are communicated to each other, no pressure difference is caused thereamong, so that no rotation torque is generated at the main shaft 24.

(5) of FIG. 3 shows a state where the liner 21 rotates by 180 degrees from the striking position. Here, the protruded seal surfaces 26*a* and 26*b* are asymmetrically (not symmetrically) disposed on the main shaft 24 with respect to the axis thereof. Therefore, in this position, the protruded seal surfaces 27*b*, 27*a* respectively approach the protruded seal surfaces 26*a*, 26*b* but do not abut thereagainst, respectively. Similarly, the protruded seal surfaces 27*a* and 27*b* are asymmetrically (not symmetrically) disposed on the inner periphery of the liner 21 with respect to the axis of the main shaft 24. Thus, in this position, since the main shaft is scarcely influenced by the oil, the rotation torque is also scarcely generated. Since the oil filled within the inner space has viscosity and a small high-pressure chamber is formed when the protruded seal surface 27*b* or 27*a* opposes to the protruded seal surface 26*a* or 26*b*, a small rotation torque is generated unlike the cases of (2) to (4) and (6) to (8). However this rotation torque is not effective for the fastening procedure.

The states of (6) to (8) of FIG. 3 are almost the same as (2) to (4), respectively, and the rotation torque is scarcely generated in these states. When the liner 21 further rotates from the state of (8), the liner 21 returns to the state of (1). Thus, the protruded seal surfaces 27*a*, 27*b*, respectively abut against the protruded seal surfaces 26*a*, 26*b*, and the blades 25*a*, 25*b* respectively abut against the protruded parts 28*a*, 28*b* on the entire axial range of the main shaft 24, whereby the inner space of the liner 21 is partitioned into the two high-pressure chambers and the two low-pressure chambers and hence a large rotation torque is generated at the main shaft 24.

Figure 4:
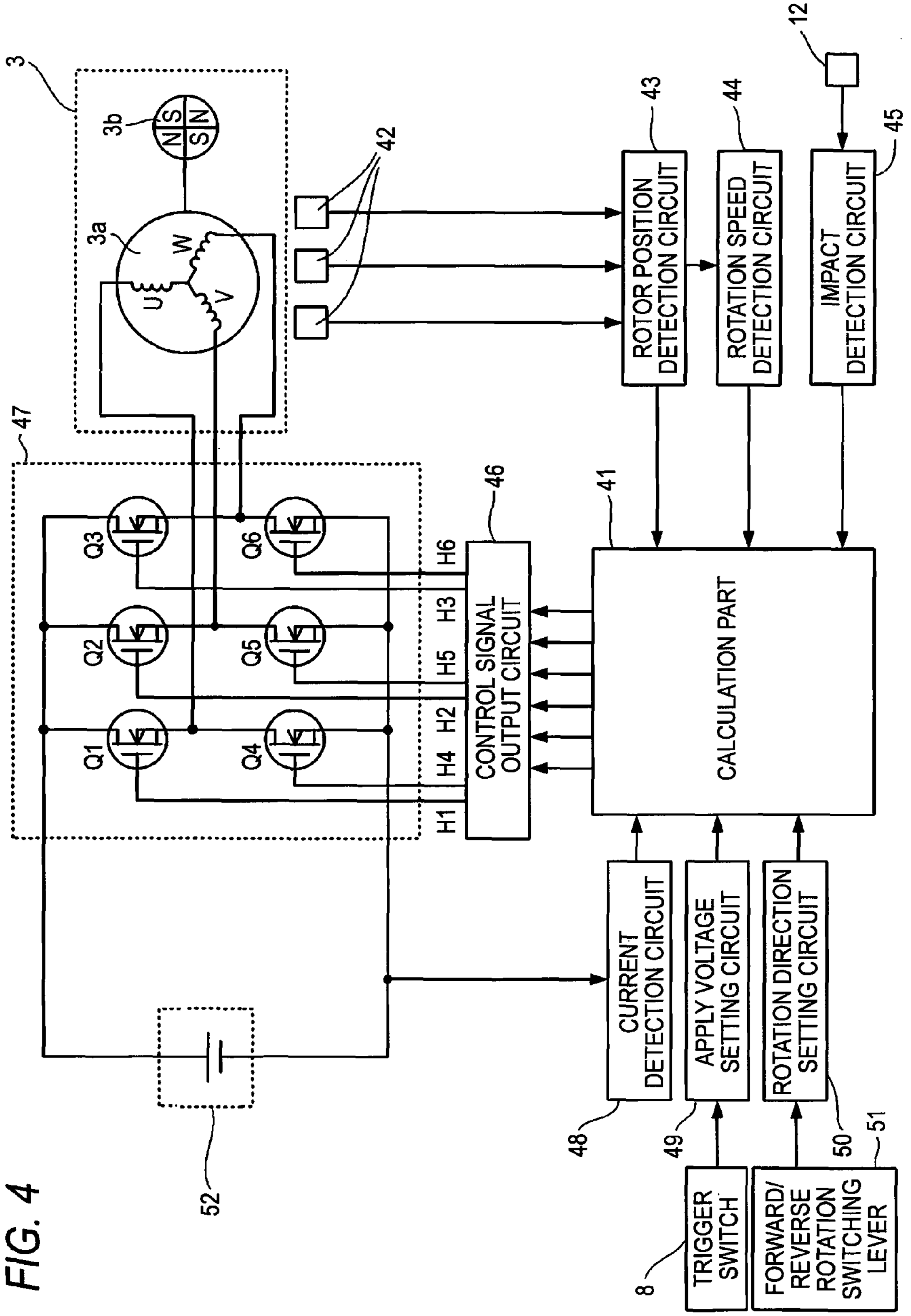
FIG. 4 shows a block configuration of the driving control system of a motor 3 according to the first embodiment.

Next, the configuration and function of the driving control system of the motor 3 will be explained with reference to FIG. 4. FIG. 4 shows a block configuration of the driving control system of the motor 3. In the first embodiment, the motor 3 is configured by a three-phase brushless DC motor. The brushless DC motor is an inner rotor type and includes a rotor 3*a* having the plural permanent magnets of pairs of N and S poles, a stator 3*b* having the three-phase stator windings U, V, W of the star-connection, and the three rotation position detection elements 42 disposed with the interval of a predetermined angle, for example, 60 degrees along the circumferential direction so as to detect the rotation position of the rotor 3*b*. The directions of the currents flowing into the stator windings U, V, W and the conduction times thereof are controlled based on position detection signals from these rotation position detection elements 42.

The inverter circuit 47 includes six switching elements Q1 to Q6 such as FETs coupled in a three-phase bridge fashion. The gates of the six switching elements Q1 to Q6 coupled in the bridge fashion are coupled to a control signal output circuit 46. The drains or sources of the six switching elements Q1 to Q6 are coupled to the star-connected stator windings U, V, W. Thus, the six switching elements Q1 to Q6 perform the switching operation in accordance with switching element drive signals (drive signals H1 to H6) inputted from the control signal output circuit 46 to thereby convert the voltage applied from a DC power supply 52 to the inverter circuit 47 into voltages Vu, Vv, Vw of three-phases (U-phase, V-phase and W-phase) and apply these voltages to the stator windings U, V, W, respectively. The DC power supply 52 may be a detachable secondary battery.

Of the switching element drive signals (three-phase signals) for driving the respective gates of the six switching elements Q1 to Q6, the drive signals for the three switching elements Q4, Q5, Q6 on the negative power supply side are supplied as pulse width modulation signals (PWM signals) H4, H5, H6, respectively. A calculation part 41 (controller) changes the pulse widths (duty ratios) of the PWM signals in accordance with the detection signal of an apply voltage setting circuit 49 based on the operation amount (stroke) of the trigger switch 8, to thereby adjust an amount of the power supplied to the motor 3 to control the start/stop and the rotation speed of the motor 3.

The PWM signals are supplied to the switching elements Q1 to Q3 on the positive power supply side of the inverter circuit 47 or the switching elements Q4 to Q6 on the negative power supply side to thereby switch the switching elements Q1 to Q3 or the switching elements Q4 to Q6 at a high speed to thereby control the power to be supplied to the stator windings U, V, W from the DC power supply. In the first embodiment, the PWM signals are supplied to the switching elements Q4 to Q6 on the negative power supply side. Thus, when the pulse widths of the PWM signals are controlled, since the power supplied to the stator windings U, V, W are adjusted, the rotation speed of the motor 3 can be controlled.

The impact driver 1 is provided with a forward/reverse rotation switching lever 51 for switching the rotation direction of the motor 3. A rotation direction setting circuit 50 sends a control signal for switching the rotation direction of the motor to the calculation part 41 (controller) when the forward/reverse rotation switching lever 51 is changed. Although not shown, the calculation part 41 (controller) includes a central processing unit (CPU) for outputting the drive signals based on a processing program and data, a ROM for storing the processing program and control data, a RAM for temporarily storing data, and a timer etc. A rotation speed detection circuit 44 receives a signal from a rotor position detection circuit 43 to detect the rotation speed of the motor 3, and outputs the detection value to the calculation part 41. The rotor position detection circuit 43 outputs a position signal representing the rotation position of the motor 3 based on the signals from the rotation position detection elements 42. An impact detection circuit 45 detects a striking impact caused by a striking operation in accordance with the signal from the impact sensor 12 and outputs the detection value to the calculation part 41.

The calculation part 41 (controller) outputs the drive signals for alternately switching the predetermined switching elements Q1 to Q6 based on the output signals from the rotation direction setting circuit 50 and the rotor position detection circuit 43 and outputs the drive signals to the control signal output circuit 46. Thus, the current is alternately supplied to the predetermined windings of the stator windings U, V, W to thereby rotate the rotor 3*b* in the set rotation direction. In this case, the drive signals applied to the switching elements Q4 to Q6 on the negative power supply side of the inverter circuit 47 are outputted as the PWM modulation signals based on the output control signal from the apply voltage setting circuit 49. The current supplied to the motor 3 is measured by a current detection circuit 48 and the measured value is feedbacked to the calculation part 41, whereby the drive signals are adjusted so that the set drive power is applied to the motor. The PWM signals may be supplied to the switching elements Q1 to Q3 on the positive power supply side.

Figure 5:
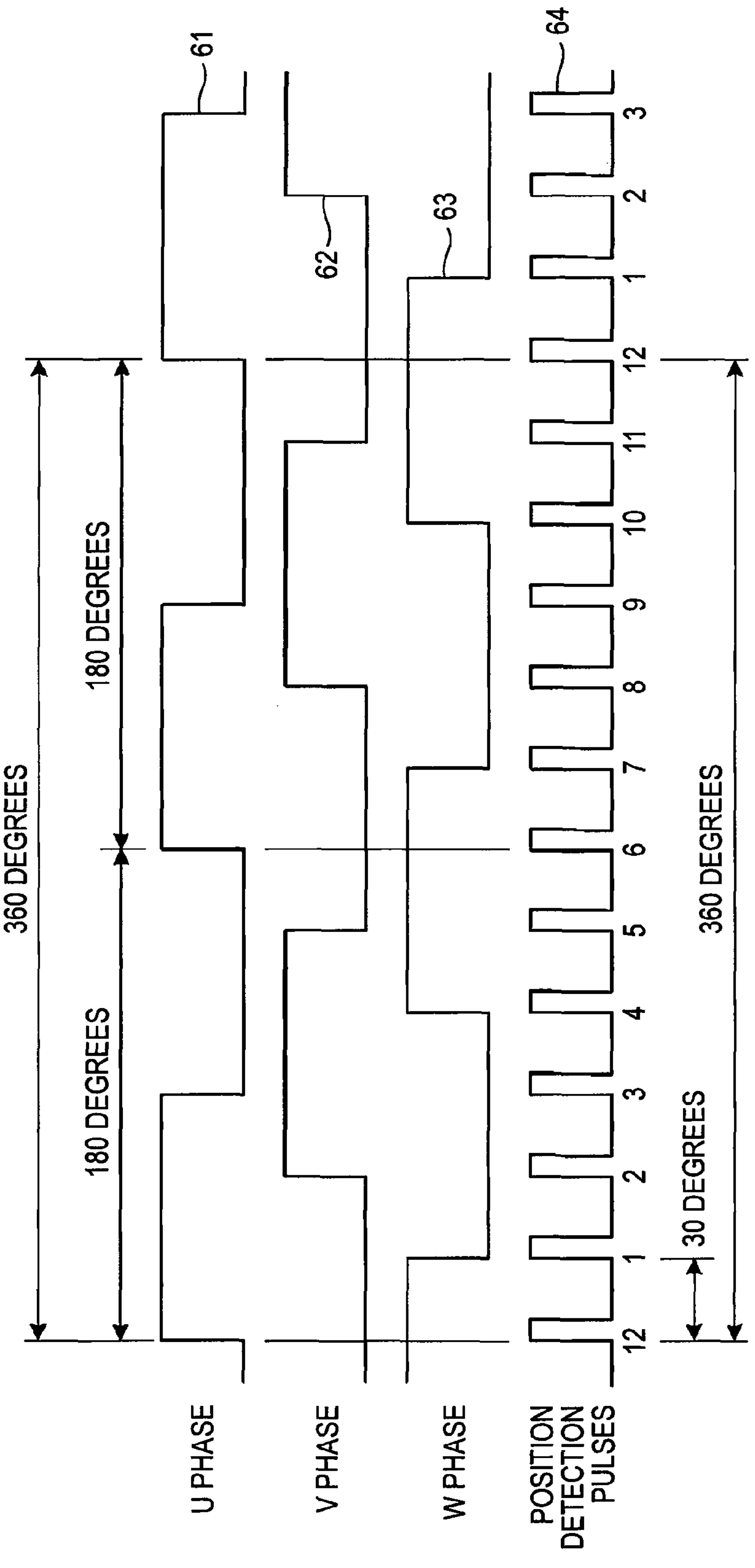
FIG. 5 exemplifies a relation between the output waveforms of a rotor position detection circuit 43 and the rotation position signal of the motor 3.

FIG. 5 exemplifies a relation between the output waveforms of the rotor position detection circuit 43 and the rotation position signal of the motor 3. Since the motor 3 is a three-phase two-pole motor, the three rotation position detection elements 42 for the U-, V- and W-phases are provided with an interval of 60 degrees. Rectangular waveforms 61 to 63 are obtained by subjecting the output signals of the rotation position detection elements 42 to the analog-to-digital (A/D) conversion processing. Each of the rectangular waveforms is changed between a low level and a high level alternately at every 90-degrees rotation of the rotor 3*b*. A rectangular waveform 64 is a narrow pulse generated at every 30-degrees rotation of the rotor 3*b* in response to the rising edge or the falling edge of the rectangular waveforms 61 to 63 for the U-, V- and W-phases. This rectangular waveform 64 is used as the position detection pulse, and the twelve position detection pulses appear during 360-degrees rotation of the rotor 3*b*. In FIG. 5, the rectangular waveform 64 becomes the high level at every 360-degrees rotation of the rotor 3*b* from the start point (rotation angle=0, the position signal "12"), and the twelfth rectangular pulse appears when the rotor 3*b* rotates by 360 degrees with respect to the stator 3*a*.

In the oil pulse unit 4 according to the first embodiment, the input portion (liner plate 23) is coupled to the rotation shaft of the motor 3. Thus, the liner 21 is synchronizedly rotates with the rotor 3*b* to have the same rotation angle therewith. The rotation of the liner 21 is not completely synchronized with the rotation of the main shaft 24 as shown in FIG. 3. However, when the main shaft 24 rotates by a given angle in the striking operation, the liner 21 (the rotor 3*b*) will rotate by "360 degrees +the given angle" until reaching the next striking position.

Figure 6:
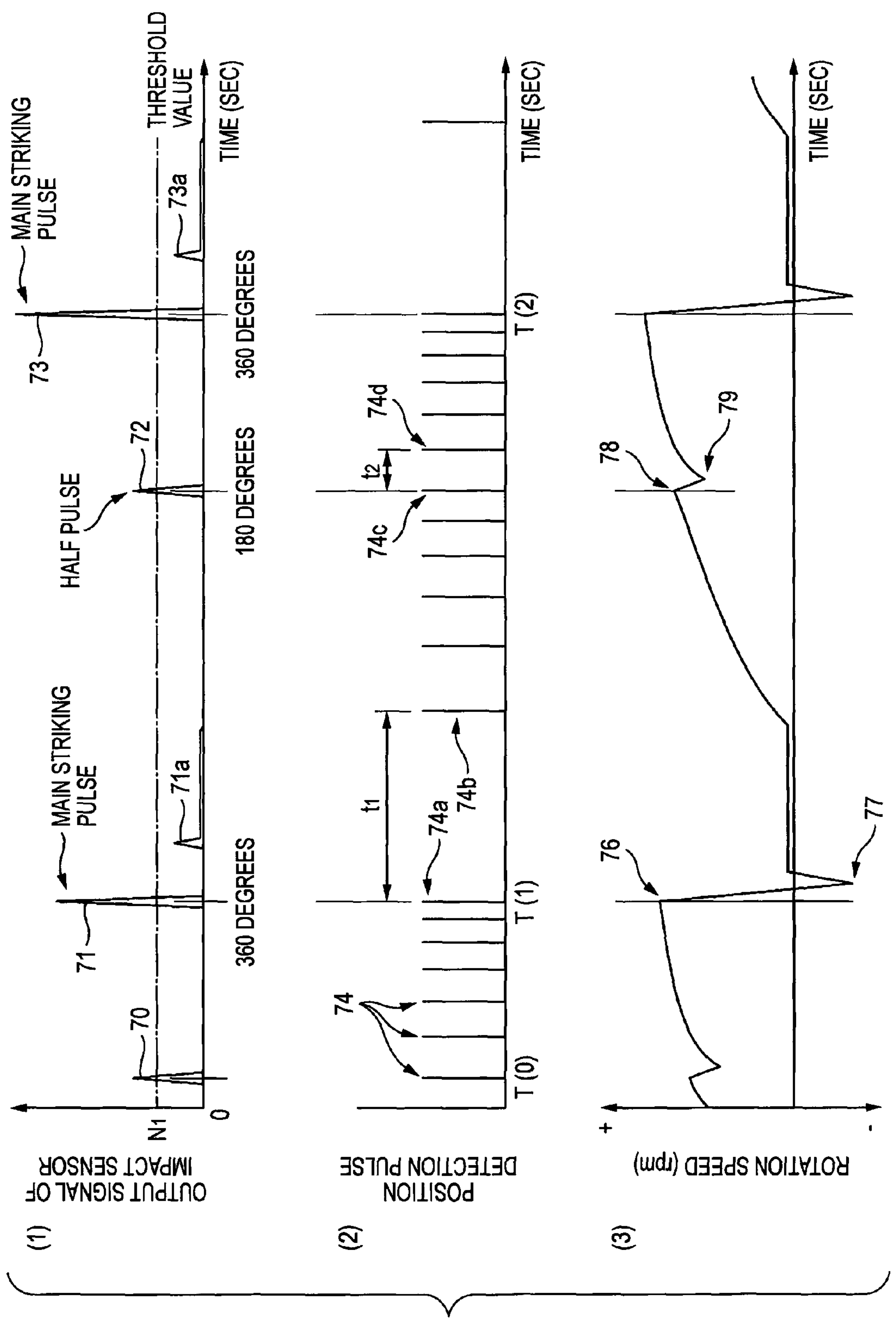
FIG. 6 exemplifies the striking timing in the oil pulse unit 4, the output signal of an impact sensor 12 and the rotation speed of the motor 3, according to the first embodiment.

FIG. 6 exemplifies the striking timing in the oil pulse unit 4, the output signal of the impact sensor 12 and the rotation speed of the motor 3, according to the first embodiment. In FIG. 6, the abscissa of the three graphs represents the time, and the scales of these graphs are the same. (1) of FIG. 6 shows the output signals of the impact sensor at the strikings. The pulse-like output peak of the impact sensor appears largely at the position (main striking position) of the 360-degrees rotation of the liner 21 shown in (1) of FIG. 3 (see arrows 71, 73). Since the liner 21 slightly rotates in the reverse direction after the main striking and then passes the striking position again, a small output peak 71*a* also appears. However, since the threshold value N1 is set for the output signal of the impact detection circuit 45, the output peak equal to or smaller than the threshold value N1 is ignored. When the output peak 71*a* is not adopted for the processing in the calculation part 41, this output peak 71*a* does not affect the fastening control. Similarly, when an output peak 73*a* is equal to or smaller than the threshold value N1, this output peak 73*a* is also ignored.

On the other hand, an output peak 72 appears at the position (pseudo striking position) rotated by almost 180 degrees from the main striking position, that is, at a position shown in (5) of FIG. 3. In the first embodiment, such output peak due to the pseudo striking is called a "half pulse" with respect to a "main striking pulse" due to the main striking. This output peak 72 is not necessary for the fastening control, and it is preferable to ignore this output peak 72. However, such half-pulse output peak 72 often exceeds the threshold value N1, and it is difficult to automatically eliminate such half-pulse output peak 72 from the processing in the calculation part 41. The half-pulse output peak 72 may cause the erroneous detection of the main-striking output peak 71 or 73, and the impact driver 1 may not be able to perform the fastening control correctly when the output peaks 71 and 73 due to the main striking are not discriminated correctly.

According to the first embodiment, the rotation angle of the oil pulse unit 4 from a given output peak (71, for example) to a next output peak (72, for example) is detected. And, based on this detection result, it is determined whether the next output peak is the main-striking output peak or the half-pulse output peak. (2) of FIG. 6 represents the appearance timings of the position detection pulses 74. The position detection pulse 74 appears at every 30-degrees rotation of the motor 3 and the liner 21. Although the position detection pulse 74 has a rectangular-like shape as shown by 64 in FIG. 5, it is simplified as a vertical line in this figure. (3) of FIG. 6 represents the rotation speed of the motor 3.

After the main-striking output peak 71, the rotation speed of the motor 3 largely reduces due to a striking (an arrow 76) and the motor rotates in the reverse direction slightly (arrow 77). Since the motor 3 rotates reversely as shown by 77, an interval t1 of the position detection pulses from 74*a* to 74*b* becomes quite large as compared with an interval between the other position detection pulses. On the other hand, after the half-pulse output peak 72, the rotation speed of the motor 3 slightly reduces (an arrow 79) due to the small striking force (an arrow 78). Thus, an interval t2 of the position detection pulses from 74*c* to 74*d* immediately after the output peak 72 increases slightly. However, since the interval t1 is quite large as compared with the interval t2, it is possible to easily determine the main striking pulse or the half pulse by comparing the intervals t1, t2.

Next, the procedure for determining the main striking pulse or the half pulse will be explained with reference to flowcharts shown in FIGS. 7 and 8. The flowcharts shown in FIGS. 7 and 8 may be implemented as a software, for example, by causing a microprocessor in the calculation part 41 to execute the program.

Figure 7:
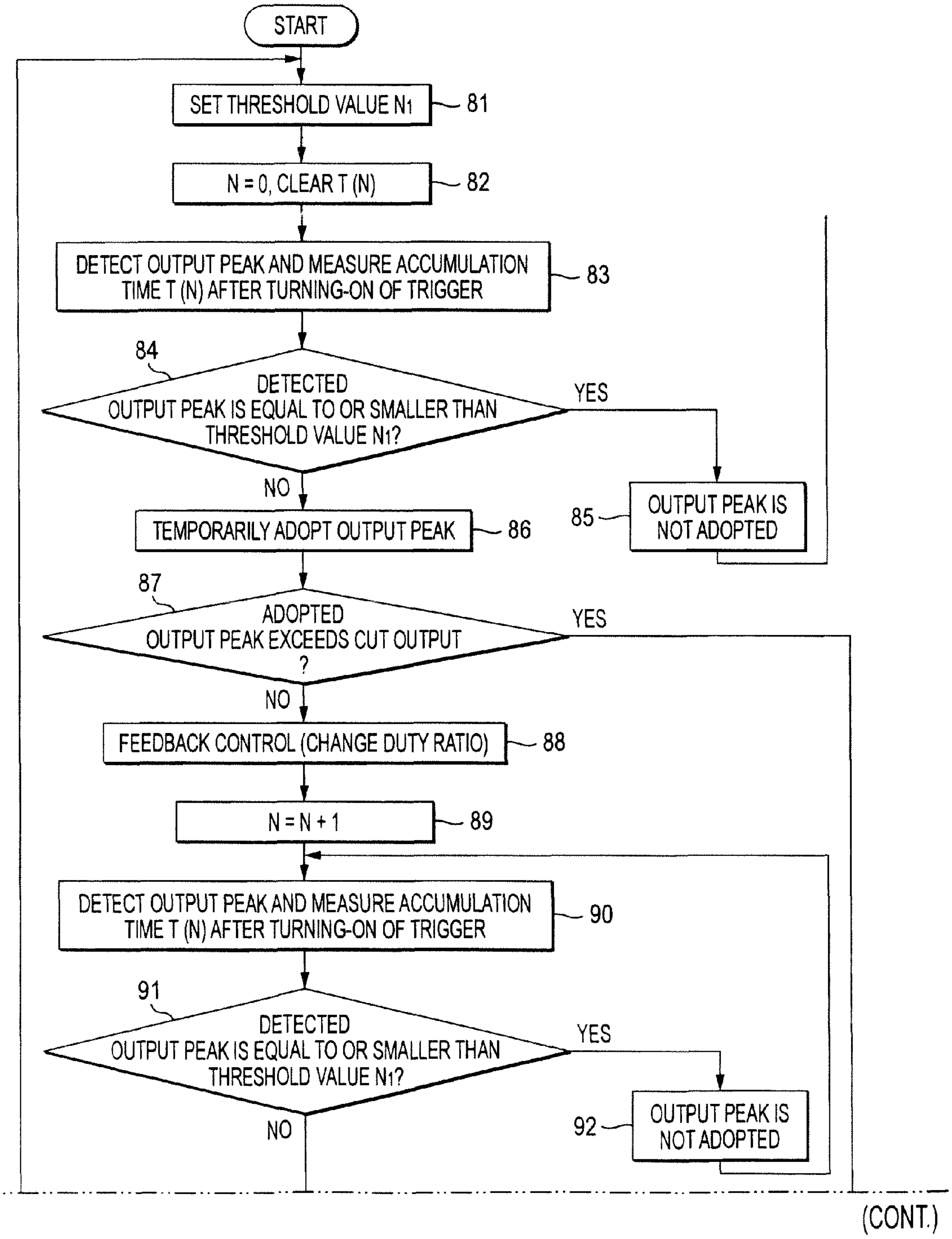
FIG. 7 exemplifies a control flowchart (1) for determining an output peak due to a main striking according to the first embodiment.

In FIG. 7, when the trigger is pulled, the motor 3 is started and the threshold value N1 is set (step 81). As explained with reference to FIG. 6, the threshold value N1 is used to determine whether or not the calculation part 41 adopts the output signal from the impact detection circuit 45. Next, 0 is set to a counter N for counting the output peaks (the counter N is cleared), and a counter for a trigger accumulation time T (N) is cleared (step 82).

Next, the calculation part 41 monitors the output waveform from the impact detection circuit 45 and, when the output peak is detected, measures the accumulation time T (N) (N=0 in this case) from an activation (turning-on or pulling) of the trigger switch 8 to the detection of the output peak (step 83). When the output peak is equal to or smaller than the threshold value N1 (step 84), this output peak is determined not to be adopted for the succeeding processing (step 85) and the process returns to step 83. In step 84, when it is determined that the output peak is larger than the threshold value N1, the calculation part 41 temporarily adopt the output peak for the succeeding processing (step 86). Next, it is determined whether or not the adopted output peak exceeds a cut output value (a target completion value for fastening the fastening subject) (step 87). When the output peak exceeds the cut output value, it is determined that the fastening operation is completed, whereby the motor is stopped (step 98). When the output peak just after the activation of the trigger switch 8 exceeds the cut output value, as it is likely that the fastening subject such as a screw or a bolt had been already fastened, an alarm may be given for the user by a not-shown error processing.

When it is determined that the adopted output peak does not exceed the cut output value in step 87, a feedback control for changing the duty ratio is performed. That is, the calculation part 41 sets a target output for the next striking operation and controls the rotation of the motor 3 to perform the next striking with the target output (step 88). Usually, when performing the striking, the rotation of the motor 3 is controlled so that an output peak corresponding to the target output is generated. For example, a predetermined initial value is set as the target output Tr1 of the first striking, and an actual striking operation is performed based on the target output Tr1. When the peak output T is obtained through the actual striking, the next target output Tr2 is calculated based on the actual peak output T to thereby perform the next striking. Such controlling of the next target output for the next striking operation based on the previous striking operation is called a feedback control. In the feedback control, for example, the duty ratio is increased when the output peak adopted in step 86 is smaller than the target output, and the duty ratio is reduced when the output peak adopted in step 86 is larger than the target output.

Next, the counter N is incremented by one (step 89) and the next output peak is monitored (step 90). When the next output peak is detected, the measurement is made as to the accumulation time T (N) (N=1 in this case) from the activation of the trigger switch 8 to the detection of the output peak (step 83). In step 91, when it is determined that the detected output peak is equal to or smaller than the threshold value N1, this output peak is determined not to be adopted for the succeeding processing (step 92) and the process returns to step 90. In step 91, when it is determined that the output peak is larger than the threshold value N1, a time difference TD(N)=T(N)−T(N-1) is calculated and simultaneously the number PN(N) of the position detection pulses from the time T(N-1) to the time T(N) is counted (step 93). Then, the calculation part 41 temporarily adopts the output peak for the succeeding processing (step 94) and it is determined whether or not the adopted output peak exceeds the cut output value (step 95). When the output peak exceeds the cut output value, it is determined that the fastening operation is completed, whereby the motor is stopped (step 98). When it is determined that the adopted output peak does not exceed the cut output value (step 95), the calculation part 41 performs the feedback control for changing the duty ratio, then sets a target output for the next striking operation and controls the rotation of the motor 3 to perform the next striking with the target output (step 96).

According to the aforesaid processing from step 81 to step 96, it is assumed that the calculation part 41 temporarily adopts the two output peaks exceeding the threshold value N1 after starting the rotation of the motor 3. Each adopted output peak may correspond to the main striking pulse or the half pulse. However, at this stage, it is impossible to determine the main striking pulse or the half pulse. This state will be explained with reference to FIG. 9.

Figure 9:
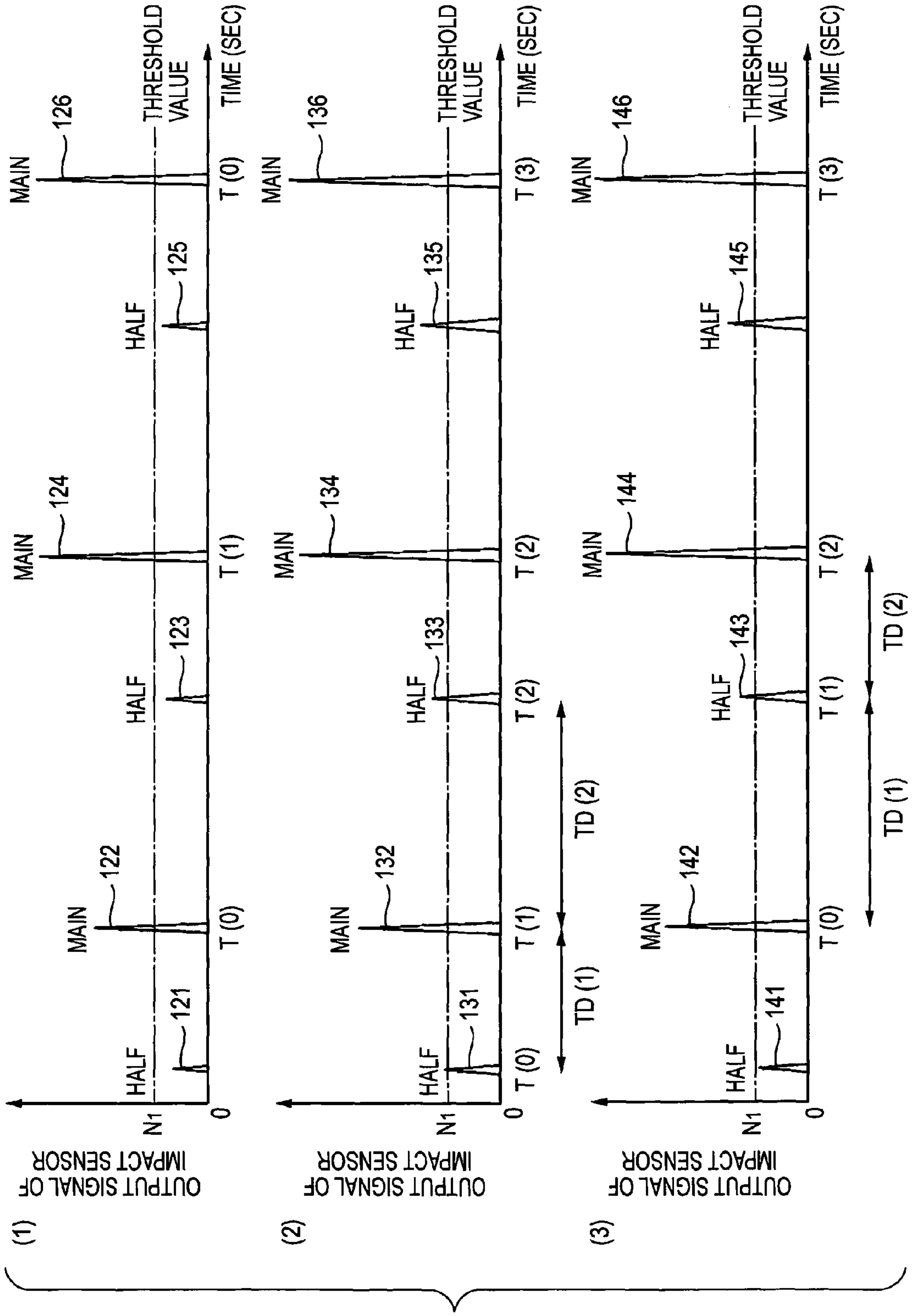
FIG. 9 exemplifies the adopted two output peaks in the first embodiment.

FIG. 9 exemplifies the adopted two output peaks. In (1) of FIG. 9, two of the main-striking output peaks 122, 124 are respectively adopted at the time T(0) and the time T(1). Since the output peak 121 appeared first is equal to or smaller than the threshold value N1, this output peak 121 is not adopted in step 85 and ignored. Similarly, since the output peak 123 appeared next to the output peak 122 is equal to or smaller than the threshold value N1, this output peak 123 is also not adopted in step 92 and ignored.

In (2) of FIG. 9, the half-pulse output peak 131 is adopted at the time T(0), and the main-striking output peak 132 is adopted at the time T(1). In (3) of FIG. 9, the main-strike output peak 142 is adopted at the time T(0), and the half-pulse output peak 143 is adopted at the time T(1).

The explanation will be made again with reference to FIG. 7. In step 97, the calculation part 41 determines whether or not the number PN(N) of the position detection pulses from the time T(N-1) to the time T(N) (N=1 in this case) is 9 or more (step 97). In (1) of FIG. 9, since each of the output peaks 122, 124 respectively adopted at the time T(0) and the time T(1) is the main-striking output peak, the rotation angle therebetween is theoretically about 360 degrees. Thus, as explained with reference to FIG. 5, since the number PN(1) becomes almost 12 and is equal to or larger than 9, the processing returns to step 82 from step 97. In (1) of FIG. 9, since each of the half-pulse output peaks 121, 123, 125 is equal to or less than the threshold value N1, the half-pulse output peaks 121, 123, 125 can be effectively eliminated by merely using the threshold value N1.

In (2) and (3) of FIG. 9, one of the two output peaks at the times of T(0) and T(1) is the main-pulse output peak, and the other thereof is the half-pulse output peak, whereby the rotation angle therebetween is theoretically about 180 degrees. Since the number PN(1) becomes almost 6 and is smaller than 9, the processing proceeds to step 99 (FIG. 8) in order to determine which one of the output peaks at the times of T(0) and T(1) is the output peak due to the main striking.

The number PN(N) of 6/9/12 respectively corresponds to the rotation angle of about 180/270/360 degrees.

Figure 8:
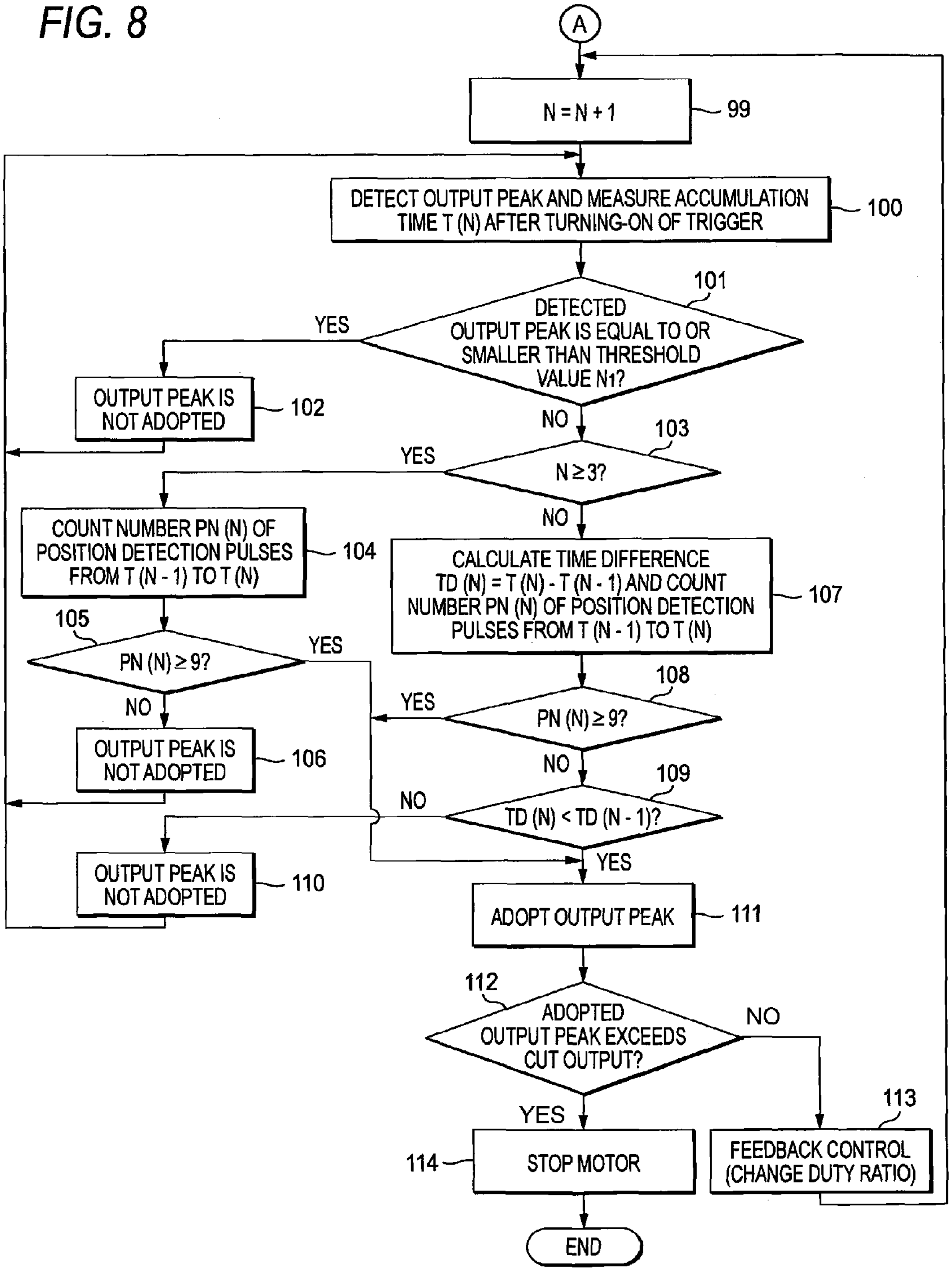
FIG. 8 exemplifies a control flowchart (2) for determining an output peak due to a main striking according to the first embodiment.

In step 99 of FIG. 8, the counter N is incremented by one, and the next output peak is monitored (step 100). When the output peak is detected, the measurement is made as to the accumulation time T (N) (N=2 for example) from the activation of the trigger switch 8 to the detection of the output peak (step 100). In step 101, when it is determined that the detected output peak is equal to or smaller than the threshold value N1, this output peak is determined not to be adopted for the succeeding processing (step 102) and the process returns to step 100. In contrast, in step 101, when it is determined that the detected output peak is larger than the threshold value N1, it is determined whether or not N is smaller than 3 (step 103). When N is equal to or larger than 3, the process proceeds to step 104 to thereby count the number PN(N) of the position detection pulses from the time T(N-1) to the time T(N). In step 105, when the number PN(N) is equal to or larger than 9, the process proceeds to step 111. In step 105, when the number PN(N) is equal to or larger than 9, it can be determined that each of the output peaks at the times of T(N-1) and T(N) is the main-striking output peak. Theoretically, when each of the output peaks at the times of T(N-1) and T(N) is the half-pulse output peak, the number PN(N) also becomes about 12 at step 105. However, it is unlikely that the two half-pulse output peaks continuously exceed the threshold value N1 while the main-striking output peak therebetween does not exceed the threshold value N1. Therefore, in step 105, the possibility that each of the output peaks at the times of T(N-1) and T(N) is the half-pulse output peak can be reasonably eliminated.

When it is determined in step 103 that N is smaller than 3, the process proceeds to step 107 to thereby calculate the time difference TD(N)=T(N)−T(N-1) while counting the number PN(N) of the position detection pulses from the time T(N-1) to the time T(N). In both of (2) and (3) of FIG. 9, when N=2, the number PN(2) from the time T(1) to the time T(2) becomes almost 6. Thus, it is determined to be no in step 108 and the process proceeds to step 109, whereat it is determined whether or not the time difference TD(N) is smaller than the time difference TD(N-1).

As described above, the rotation speed of the motor 3 largely reduces after the main striking. That is, the time period from the main-striking output peak to the half-pulse output peak is longer than the time period from the half-pulse output peak to the main-pulse output peak.

When N=2 in (2) of FIG. 9, the time difference TD(2) is larger than the time difference TD(1). Therefore, the output peak 133 appeared at the time T(2) is determined to be the output peak due to the half pulse, whereby the output peak 133 is determined not to be adopted and the process returns to step 100 (step 110). After returning to step 100, since the number PN(2) of the position detection pulses at the next output peak 134 is almost 12, the output peak 134 is immediately determined to be the output peak due to the main striking and adopted in step 111.

On the other hand, when N=2 in (3) of FIG. 9, since the time difference TD(2) is smaller than the time difference TD(1), the output peak 144 appeared at the time T(2) is determined to be the output peak due to the main striking, whereby this output peak is adopted (step 111). Next, it is determined whether or not the adopted output peak exceeds the cut output value (step 112). When the adopted output peak does not exceed the cut output value, the calculation part 41 performs the feedback control for changing the duty ratio, and the process returns to step 99 (step 113). When it is determined that the adopted output peak exceeds the cut output value in step 112, it is determined that the fastening operation is completed, whereby the motor 3 is stopped (step 114).

As explained above, according to the first embodiment, the output peak of the striking sensor is detected at every main striking to thereby control the rotation speed of the motor based on the detected output peaks. Since the output peak due to the main striking and the output peak due to the half pulse can be effectively discriminated at the start stage of the rotation, the fastening operation of the rotary striking tool can be controlled accurately. If the output peak due to the half pulse can not be eliminated only by setting the threshold value N1, according to the first embodiment, the output peak due to the main striking can be accurately discriminated, and the reliability of the rotation control and the fastening accuracy for the rotary striking tool can be improved.

[Second Embodiment]

In a second embodiment, the configuration of the impact driver is the same as that in the first embodiment. Therefore, the explanation thereof will be omitted.

Figure 10:
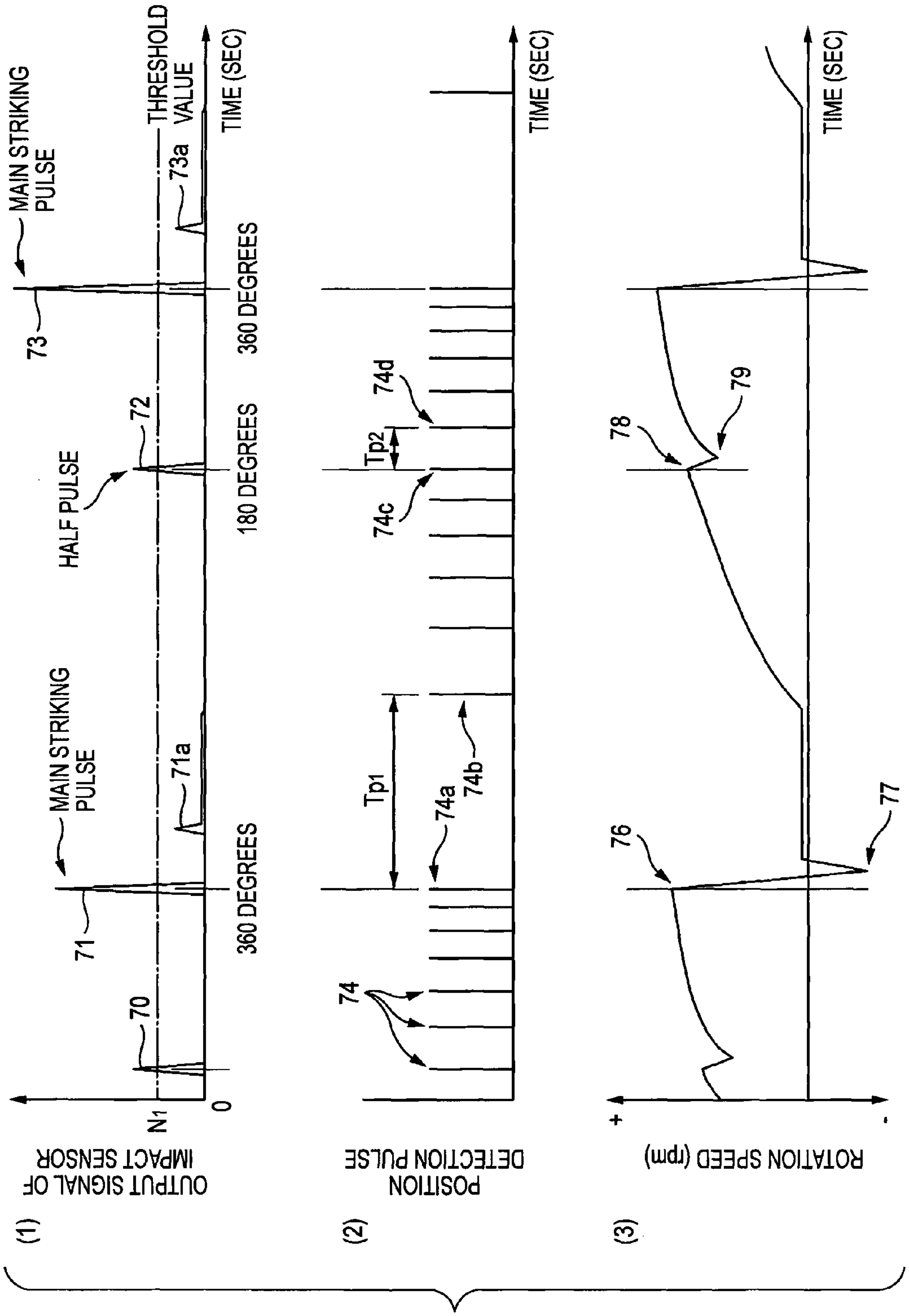
FIG. 10 exemplifies the striking timing in the oil pulse unit 4, the output signal of an impact sensor 12 and the rotation speed of the motor 3, according to a second embodiment.

FIG. 10 exemplifies the striking timing in the oil pulse unit 4, the output signal of the impact sensor 12 and the rotation speed of the motor 3, according to the second embodiment. In FIG. 10, the abscissa of the three graphs represents the time, and the scales of these graphs are the same. (1) of FIG. 10 shows the output signals of the impact sensor at the strikings. The pulse-like output peak of the impact sensor appears largely at the position (main striking position) of the 360-degrees rotation of the liner 21 shown in (1) of FIG. 3 (see arrows 71, 73). Further, since the liner 21 slightly rotates in the reverse direction after the main striking and then passes the striking position again, a small output peak 71*a* appears. However, since the threshold value N1 is set for the output signal of the impact detection circuit 45, the output peak equal to or smaller than the threshold value N1 is ignored. When the output peak 71*a* is not adopted for the processing in the calculation part 41, this output peak does not affect the fastening control. Similarly, when an output peak 73*a* is equal to or smaller than the threshold value N1, this output peak 73*a* is also ignored.

On the other hand, an output peak 72 appears at the position (pseudo striking position) rotated by almost 180 degrees from the main striking position, that is, at a position shown in (5) of FIG. 3. In the second embodiment, such output peak due to the pseudo striking is called a "half pulse" with respect to a "main striking pulse" due to the main striking. This output peak 72 is not necessary for the fastening control, and it is preferable to ignore this output peak 72. However, such half-pulse output peak 72 often exceeds the threshold value N1, and it is difficult to automatically eliminate such half-pulse output peak 72 from the processing in the calculation part 41. The half-pulse output peak 72 may cause the erroneous detection of the main-striking output peak 71 or 73, and the impact driver 1 may not be able to perform the fastening control correctly when the output peaks 71 and 73 due to the main striking are not discriminated correctly.

According to the second embodiment, a time interval Tp1 from a given output peak (71, for example) to a position detection pulse (74*b*, for example) appearing next is detected. And, based on whether Tp1 is equal to or more than a predetermined time, it is determined that the next output peak is the main-striking output peak or the half-pulse output peak. (2) of FIG. 10 represents the appearance timings of the position detection pulses 74. The position detection pulse 74 appears at every 30-degrees rotation of the motor 3 and the liner 21. Although the position detection pulse 74 has a rectangular-like shape as shown by 64 in FIG. 5 it is simplified as a vertical line in this figure. (3) of FIG. 10 represents the rotation speed of the motor 3.

After the main-striking output peak 71, the rotation speed of the motor 3 largely reduces due to a striking (an arrow 76) and the motor rotates in the reverse direction slightly (arrow 77). Since the motor 3 rotates reversely as shown by 77, an interval Tp1 of the position detection pulses from 74*a* to 74*b* becomes quite large as compared with an interval between the other position detection pulses. On the other hand, after the half-pulse output peak 72, the rotation speed of the motor 3 slightly reduces (an arrow 79) due to the small striking force (an arrow 78). Thus, an interval Tp2 of the position detection pulses from 74*c* to 74*d* immediately after the output peak 72 increases slightly. However, since the interval Tp1 is quite large as compared with the interval Tp2, it is possible to easily determine the main striking pulse or the half pulse by comparing each of the intervals Tp1, Tp2 with a reference value Td set in advance.

Next, the procedure for determining the main striking pulse or the half pulse will be explained with reference to a flowchart shown in FIG. 11. The flowchart shown in FIG. 11 may be implemented as a software, for example, by causing a microprocessor in the calculation part 41 to execute the program.

Figure 11:
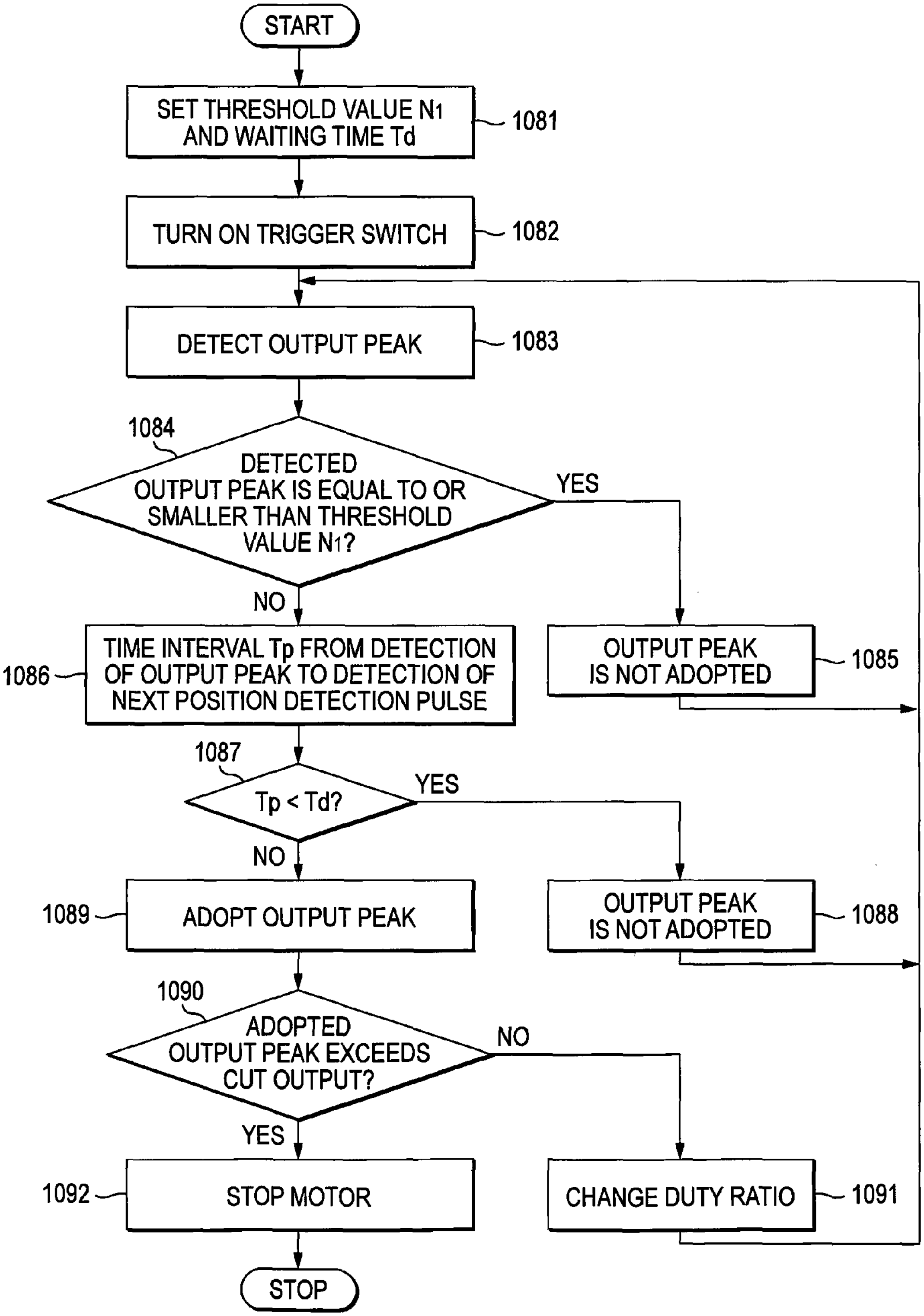
FIG. 11 exemplifies a control flowchart for determining an output peak due to a main striking according to the second embodiment.

In FIG. 11, the threshold value N1 and a waiting time Td is set (step 1081). The waiting time Td is the reference value for determining whether or not an output peak is the main-striking output peak or the half-pulse output peak. Then, when the trigger switch is pulled, the motor 3 is started (step 1082).

Then, the part 41 monitors the output values from the impact detection circuit 45 and the position signal from the rotor position detection circuit 43 to thereby detect the output peak (step 1083). When the detected output peak is equal to or smaller than the threshold value N1, this output peak is not adopted for controlling the rotation of the motor 3 and the process returns to step 1083 (steps 1084, 1085). In contrast, when the detected output peak is larger than the threshold value N1 (step 1084), a time interval Tp from the detection of this output peak to the detection of the position detection pulse appearing next is measured (step 1086).

Next, it is determined whether or not the measured time interval Tp is equal to or less than Td (step 1087). The time interval Td as the reference may be an average value of the time interval between the position pulses 74*a* and 74*b* and the time interval between the position pulses 74*c* and 74*d* shown in FIG. 11, for example. When the time interval Tp is smaller than Td, it means that the degree of the rotation speed reduction of the motor 3 due to the striking corresponding to this output peak is small, whereby this output peak is considered to be an output peak due to the half pulse. Accordingly, this output peak is not adopted and the process returns to step 1083 (step 1088). On the other hand, when the time interval Tp is equal to or larger than Td, it means that the degree of the rotation speed reduction of the motor 3 due to the striking corresponding to this output peak is large, whereby this output peak is considered to be an output peak due to the main striking. Accordingly, this output peak is adopted (step 1089).

Next, it is determined whether or not the adopted output value exceeds the cut output value (the target completion value for fastening the fastening subject) (step 1090). When the output value exceeds the cut output value, it is determined that the fastening operation is completed, whereby the motor is stopped (step 1092). In contrast, when the output value does not exceed the cut output value, the feedback control for changing the duty ratio is performed, and the process returns to step 1083 (step 1091). The calculation part 41 sets a target output for the next striking operation and controls the rotation of the motor 3 to perform the next striking with the target output, and then the process returns to step 1083 (step 1091). Usually, when performing the striking, the rotation of the motor 3 is controlled so that a predetermined target output is generated by the striking. For example, a predetermined initial value is set as the target output Tr1 of the first striking, and an actual striking operation is performed based on the target output Tr1. When the peak output T is obtained through the actual striking, the next target output Tr2 is calculated based on the actual peak output T to thereby perform the next striking. Such controlling of the next target output for the next striking operation based on the previous striking operation is called a feedback control. In the feedback control, for example, the duty ratio is increased when the output peak adopted in step 1089 is smaller than the target output, and the duty ratio is reduced when the output peak adopted in step 1089 is larger than the target output.

Figure 12:
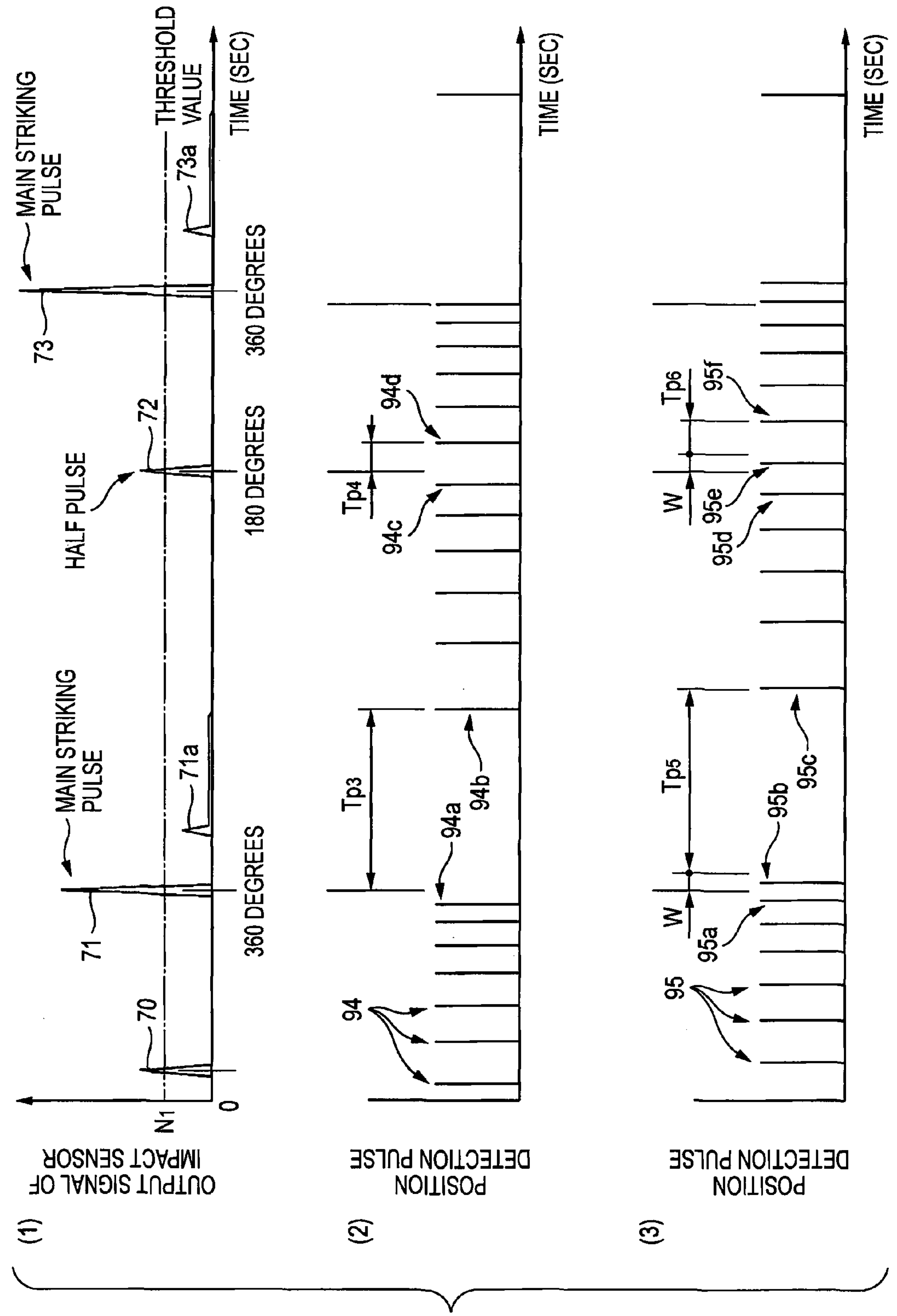
FIG. 12 exemplifies another example of main striking positions, half pulse positions and appearance positions of position detection pulses.

FIG. 12 exemplifies another example of the main-striking output peaks, the half-pulse output peaks and the position detection pulses. In (1) and (2) of FIG. 10, it is assumed that the main-striking output peak 71 and the half-pulse output peak 72 appear simultaneously with the respective position detection pulses. However, practically, the main-striking output peak and the half-pulse output peak may not appear synchronously with the respective position detection pulses, and the main-striking output peak and the half-pulse output peak may be shifted from the respective position detection pulses, as shown in FIG. 12. In this case, a position detection pulse 94*b* appearing after the output peak 71 is detected, and the time interval Tp3 from the output peak 71 to the next position detection pulse 94*b* is measured. By determining whether or not the measured time interval Tp3 is equal to or shorter than Td, it is immediately determined whether the detected output peak is an output peak due to the main striking or the half pulse. Similarly, a position detection pulse 94*d* appearing after the output peak 72 is detected, and the time interval Tp4 from the output peak 72 to the next position detection pulse 94*d* is measured. By determining whether or not the measured time interval Tp4 is equal to or smaller than Td, it is immediately determined whether the detected output peak is an output peak due to the main striking or the half pulse.

As shown in (3) of FIG. 12, a next position detection pulse 95*b* may appear immediately after the main-striking output peak 71. In this case, although the output peak 71 is due to the main strike, the time interval Tp from the output peak 71 and the next position detection pulse 95*b* is smaller than Td, and the output peak 71 may be erroneously determined as an output pulse due to the half pulse. Thus, a dead time W may be provided immediately after the output peak so as not to detect the next position detection pulse during this dead time W. In the case of the main-striking output peak 71, a time interval Tp5 from the termination of the dead time W to a position detection pulse 95*c* detected first thereafter is measured, and whether or not the time interval Tp5 is equal to or less than the reference time interval Td is determined. By setting the dead time, it becomes possible to accurately determine the main-striking output peak or the half-pulse output peak. The length of the dead time W may be set with reference to an interval of the position detection pulses at the set rotation speed of the motor. Similarly, in the case of the half-pulse output peak 72, a time interval Tp6 from the termination of the dead time W to a position detection pulse 95*f* detected first thereafter is measured, and whether or not the time interval Tp6 is equal to or less than the reference time interval Td is determined.

As explained above, according to the second embodiment, the output peak of the striking sensor at every main striking is detected to thereby control the rotation speed of the motor based on the detected output peaks. Since the output peak due to the main striking and the output peak due to the half pulse can be immediately discriminated, the fastening operation of the rotary striking tool can be controlled accurately. If the output peak due to the half pulse can not be eliminated only by setting the threshold value N1, according to the second embodiment, the output peak due to the main striking can be accurately discriminated, and the reliability of the rotation control and the fastening accuracy for the rotary striking tool can be improved.

Although the invention is explained based on the above-described embodiments, the invention is not limited thereto, and various modifications may be made within the scope of the invention. For example, although the impact driver using the oil pulse unit is exemplified as the rotary striking tool, the invention is not limited thereto, and the invention may be applied to the rotary striking tool such as an impact wrench, an impulse wrench or a driver using oil pulses or hydraulic pulses. Although the brushless DC motor is exemplified as the driving source of the impact mechanism, the invention may be applied to the rotary striking tool using another driving source such as a brush DC motor or an air motor.

What is claimed is:

1. A rotary striking tool, comprising:

a motor;

an oil pulse unit that is driven by the motor;

a detection unit that detects an impact generated at the oil pulse unit and outputs an output signal;

a rotation position detection element that detects a rotation angle of the motor and outputs a position signal; and a control unit that controls a rotation of the motor based on the output signal, wherein the control unit:

uses the output signal from the detection unit when a time interval of a position signal from the rotation position detection element is equal to or longer than a predetermined time, measures a time interval from when the output signal is generated to when the position signal is outputted from the rotation position detection element thereafter, determines the output signal corresponding to the given impact as an output signal due to a main striking when the measured time interval is equal to or longer than a predetermined time, and determines the output signal corresponding to the given impact as an output signal due to a half pulse when the measured time interval is shorter than the predetermined time.

2. The rotary striking tool of claim 1, wherein the motor further includes a rotor having a permanent magnet and a stator having a winding, wherein the rotation position detection element comprises a plurality of hall elements disposed to face the permanent magnet, and wherein the position signal is outputted based on output signals from the hall elements.

3. The rotary striking tool of claim 2, wherein three hall elements are disposed at a predetermined interval, and wherein the position signal appears each time the rotor rotates by a predetermined rotational angle.

4. The rotary striking tool of claim 1, wherein the motor is stopped when the output signal due to the main striking reaches a predetermined output signal.

5. The rotary striking tool of claim 4, wherein the control unit has a threshold value and adopts the output signal which is equal or higher than the threshold value.

6. The rotary striking tool of claim 4, further comprising:

a control unit that processes the output signal from the impact detection unit and controls a rotation of the motor based on the detection signal.

7. The rotary striking tool of claim 4, wherein the control unit includes a microprocessor and compares the used second output signal with a target output value to perform a feedback control for controlling the rotation of the motor.

* * * * *